United States Patent [19]

Neümann et al.

[11] Patent Number: 4,595,829
[45] Date of Patent: Jun. 17, 1986

[54] APPARATUS FOR AUTOMATICALLY FOCUSING OBJECTS TO BE VIEWED IN OPTICAL INSTRUMENTS

[75] Inventors: Burkhard Neümann, Schoeffengrund; Günter Reinheimer, Biebertal, both of Fed. Rep. of Germany

[73] Assignee: Ernst Leitz Wetzlar GmbH, Wetzlar, Fed. Rep. of Germany

[21] Appl. No.: 496,587

[22] Filed: May 20, 1983

[30] Foreign Application Priority Data

May 25, 1982 [DE] Fed. Rep. of Germany ....... 3219503

[51] Int. Cl.[4] ............................................. G01J 1/20
[52] U.S. Cl. ........................................ 250/201; 356/4
[58] Field of Search ......... 250/201 AF, 204, 201 DF; 354/403; 356/1, 4, 126, 399, 400, 401; 369/45; 350/332, 331, 333

[56] References Cited

U.S. PATENT DOCUMENTS

| | | | |
|---|---|---|---|
| 3,721,827 | 3/1973 | Reinheimer | 250/201 |
| 3,781,088 | 12/1973 | Tsukamoto et al. | 350/160 LC |
| 4,079,248 | 10/1976 | Lehureau et al. | 250/201 |
| 4,319,846 | 3/1982 | Henry et al. | 356/401 |
| 4,441,175 | 4/1984 | Shuman | 369/45 |
| 4,455,085 | 6/1984 | Kato et al. | 356/122 |

Primary Examiner—David C. Nelms
Assistant Examiner—James Gatto
Attorney, Agent, or Firm—Schwartz, Jeffery, Schwaab, Mack, Blumenthal & Evans

[57] ABSTRACT

An automatic focusing apparatus for optical instruments, in particular for reflected light microscopes, wherein a measuring point is produced on the surface of an object by an eccentric measuring beam formed by blocking a portion of the path of a full beam. The measuring point is imaged onto a photoelectric device by reflecting the measuring beam along the blocked out path. When the object plane wanders from the focal plane, the photoelectric device actuates a control device which returns the object plane to the focal plane. The apparatus comprises a source of light to produce a, preferably pulsed, laser light for the full measuring beam, an optical structural element for geometrically blocking one-half of the full measuring beam to produce the eccentric measuring beam and simultaneously for geometrically blocking the reflected measuring beam from the path of the full measuring beam. A lens is positioned in the measuring beam and a photodetector device in the form of a differential photodiode pair is positioned to receive the reflected measuring beam. A divider mirror, preferably dichromatic, is provided for introducing the measuring beam into the path of the illuminating beam of the optical device and for reflecting the reflected measuring beam from the path of the illuminating beam of the optical instrument.

20 Claims, 4 Drawing Figures

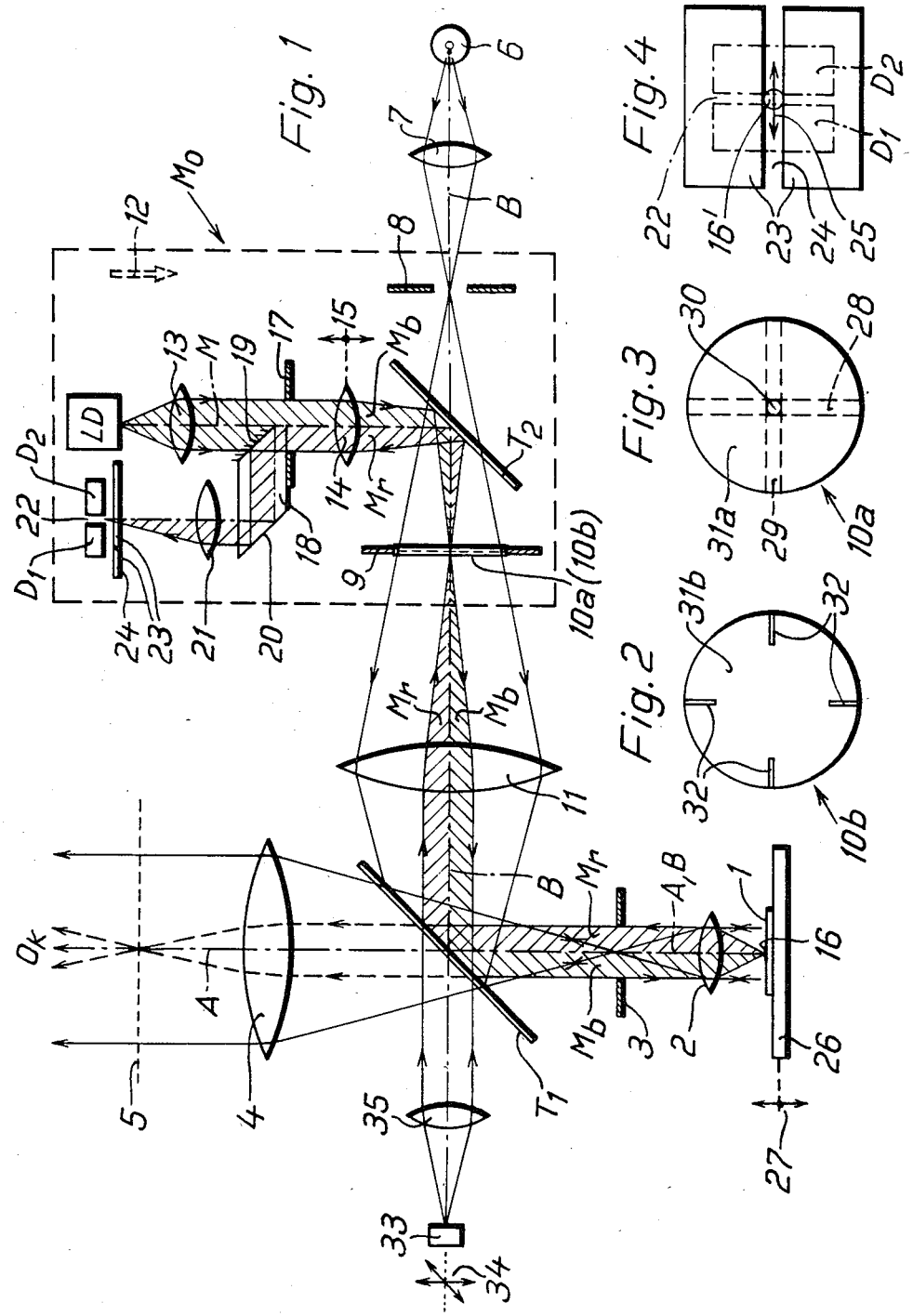

APPARATUS FOR AUTOMATICALLY FOCUSING OBJECTS TO BE VIEWED IN OPTICAL INSTRUMENTS

BACKGROUND OF THE INVENTION

The present invention relates to an apparatus for automatically focusing objects to be viewed in optical instruments with the aid of an illuminating beam of light, wherein a measuring point of light is produced on the surface of the object by a separate, eccentrically transmitted measuring beam. The measuring point is reproduced by the reflected measuring beam, which is conducted eccentrically along a path formed by blocking out a portion of the originally transmitted measuring beams, on a photoelectric device. Upon migration of the object plane from the focal plane of the objective, the signals of the photoelectric device actuate a control device, which returns the object plane to the focal plane. An apparatus of this type is known from No. DE-PS 21 02 922.

An apparatus is described in No. AT-P 353 497 for the automatic focusing of instruments on different object planes, in which, between the objective and the photoelectric sensors, an optical grating with beam splitting properties is inserted. This grating is displaceable in a controlled manner in the direction of the optical axis of the objective and may further be oscillated perpendicularly to the axis. Alternatively, the optical grating may be replaced by double wedge which is variable in thickness but otherwise stationary.

While the apparatus of No. AT-P 353 497 has the disadvantage that the system is a passive one in which the evaluation of the sharpness of the image is effected solely from the image "offered" in the corresponding intermediate image plane, the apparatus disclosed in No. DE-PS 21 02 922 has the disadvantage that in the case of an intentional setting of another object plane as the focal plane, the diameter of the spot on the object is enlarged and the spot on the object surface wanders out of the center point. Thus, it is possible in this instance that, as a result of the object surface topography, the migrating spot would impinge on a detail of the object positioned differently in the z-axis (the z-axis extends in the direction of the optical axis of the objective of the optical instrument). It is not always possible to obtain a defined offset setting in the case of objects structured in this manner with the aid of the known apparatus. A further disadvantage consists of the fact that, as the result of the spot enlargement during defocusing, a displacement of the center of intensity on bright/dark structural edges of the object occurs; this leads to an impairment of a defined offset setting, as the offset depends on the position of the center of intensity of the spot.

SUMMARY OF THE INVENTION

It is an object of the present invention to provide an apparatus for producing optional automatic focusing of objects to be viewed in an optical instrument.

Another object of the present invention is to provide an automatic focusing apparatus which operates independently of the existing object structure.

A further object of the present invention is to provide an automatic focusing apparatus in which accurate focusing can be effected regardless of the wave length of the measuring light used, the objective emoloyed or the optical element available.

An additional object of the present invention is to provide an automatic focusing apparatus having an offset which can be set in a definable manner and which provides for automatic compensation of the chromatic errors of the objective lens of the existing optical instruments.

In accordance with the above and other objects, the present invention is an apparatus for automatically focusing objects to be viewed in optical instruments having an illuminating beam path passing through an objective, onto an object to be positioned in the focal plane of said objective. The apparatus includes a laser light source for producing a full measuring beam having a defined path and an optical structural element positioned for geometrically blocking a portion of the measuring beam path to produce an eccentric measurinq beam. Means are provided for reflecting the eccentric measuring beam into the illumination beam path, and reflecting a reflected eccentric measuring beam out of the illumination beam path into the blocked portion of the full measuring beam path. Thus, the eccentric measuring beam passes through the objective, is focused by the objective as a measuring point on the object and is reflected eccentrically along the illumination path, and the eccentric reflected measuring beam is reflected out of the illumination path into the blocked portion of the full measuring beam. Means are also provided for passing the reflected eccentric measuring beam from the blocked portion of the full measuring beam path onto a differential photodetector to form an image of the measuring spot on the differential photodetector. Means are also provided for passing the reflected eccentric measuring beam from the blocked portion of the full measuring beam path onto a differential photodetector to form an image of the measuring spot on the differential photodetector. An axially adjustable lens is positioned in the path of the eccentric measuring beam and the eccentric reflected measuring beam for optically adjusting the eccentric measuring beam and the eccentric reflected measuring beam.

In operation, the position of the image of the measuring spot wanders on the photodetector in dependence on the position of the object relative to the objective focal plane.

In accordance with one embodiment, the apparatus comprises a module for insertion in the illuminating beam path of the optical instrument. The illumination beam path comprises a light source and a first partially permeable beam splitter arranged in an imaging beam path of the optical instrument; the module is positioned between the light source and the first partially permeable beam spliter.

BRIEF DESCRIPTION OF THE DRAWINGS

The above and other objects of the present invention will become more readily apparent as the invention becomes more clearly understood in connection with the detailed description to follow in which like reference numerals represent like parts throughout and in which:

FIG. 1 shows a sectional lateral elevation of the beam paths of an optical instrument, i.e. of the initially horizontal path of the illuminating beam, which subsequently coincides with the vertical path of the imaging beam, and of the modular insert according to the invention (dashed line box), which for the sake of clearer representation has been turned by 90° upwards from the plane of the drawing;

FIG. 2 shows a marker provided with line markings;

FIG. 3 shows a marker consisting of liquid crystal layers crossing each other; and FIG. 4 shows a detail view of the differential photosensor of the present invention with a slit diaphragm.

DETAILED DESCRIPTION OF THE PREFERRED EMBODIMENTS

The apparatus of the present invention comprises a source of light, for the production of a preferably pulsed laser light as the full measuring beam, an optical structural element for geometrically blocking one half of the full measuring beam to produce an eccentric measuring beam and simultaneously for blocking the reflected measuring beam from the path of the full measuring beam. A lens displaceable in the axial direction in a definable manner is positioned in the measuring beam and a photoelectric device in the form of a differential photodiode pair is positioned to receive the reflected measuring beam. A preferably dichromatic dividing mirror introduces the eccentric measuring beam into the path of the illuminating beam of the optical instrument and reflects the reflected measuring beam out of the path of the illuminating beam of the optical instrument.

For use as a retrofittable supplemental system for an optical instrument, the apparatus may be in the configuration of a module insertable into the path of the illuminating beam of the optical instrument, which is, in particular, a reflected light microscope illuminator. The apparatus is positioned between the source of light of the optical instrument and a first partially permeable beam splitter arranged in the path of the imaging beam of the optical instrument, which by means of a second, preferably dichromatic, dividing mirror is optically coupled in the path of the illuminating beam. It is further possible to provide a sliding diaphragm carrying at least two aperture diaphragms of different dimensions between the second divider mirror and the light source for the illuminating beam of the optical instrument. Additionally, a marker may be arranged in the plane of a radiant field diaphragm. Appropriately, the marker is formed by two liquid crystal layers with an adjustable light attenuation characteristic in a centrally arranged crossing area. It is possible alternatively for the marker to be formed of a glass disk with line markings in the peripheral area pointing to the center and preferably located diametrically opposed to each other.

According to an advantageous embodiment of the present invention, a slit diaphragm is positioned in front of the differential photodetector. The slit of this diaphragm is aligned so that it extends perpendicularly to the gap between the two photodiodes of the photodetector and is aligned in the direction which the image of the measuring point wanders as a function of the prevailing amount of defocusing. Appropriately, the width of the slit corresponds to the image of the measuring point. It is, however, further possible to dimension the geometry of the slit so that it widens, beginning with a narrow center part, toward the two photodiodes of the differential photodetector, symmetrically with respect to the axis of the slit.

Advantageously, an adjustable auxiliary source of light emitting a visible light may be provided. This light is imaged in an intermediate plane in the path of the imaging beam by an optical element, the first partially permeable beam splitter and a tubular lens.

According to an especially convenient embodiment of the present invention, as the light source for the measuring beam, a, preferably pulsed, laser diode emitting radiation in the IR range, preferably at 903 nm, is provided.

It is further possible to provide means for the motor driven setting of the lens in accordance with a predetermined offset. Means for the automatic compensation of chromatic errors of the objective in the active position as a function of the wave length or wave length range of the measuring beam, may also be provided. These means may comprise mechanical, optical and/or optoelectronic characteristic structural elements, which in cooperation with a control unit and the lens adjusting motor, effect displacement of the lens into an optimal, wave length and objective specific compensating position.

FIG. 1 shows a vertical path of an imaging beam A of an optical instrument. An object 1 has its surface located in the focal plane of an objective 2. The imaging beam of the first instrument passes through the objective 2. After leaving the objective pupil 3, the beam A passes through a dichromatic divider mirror $T_1$, which has a 50/50 transmission ratio in the visible range and is highly reflective in the infrared (IR) range. After passing through a tubular lens 4, an image of the object 1 is produced in an intermediate image plane 5. The beam A then arrives at an ocular $O_k$, not shown.

The path of the illuminating beam of the optical instrument in the case shown is horizontal. From a light source 6, the beam B passes through an aperture diaphragm 8 after leaving an optical device 7. A sliding diaphragm (not shown) is arranged in the plane of the aperture diaphragm 8 and contains at least two diaphragms of different dimensions. With the aid of this sliding diaphragm, an aperture diaphragm, adapted for the measurement, may be inserted manually or by a motor. The beam B then passes a dichromatic beam splitter $T_2$, which has the highest possible transmission value for the visible light coming from the light source 6 and the highest possible reflection value for IR radiation. A marker is located in the plane of a radiant field diaphragm 9, the function of which shall be explained hereinbelow. The beam B passes through a lens 11 and then passes the first dichromatic beam splitter $T_1$, from where the reflected components are deflected in the direction of object 1.

The dashed line box contains the automatic laser focusing apparatus in the form of module $M_o$. As seen in FIG. 1, module $M_o$ may be inserted, for example, in the direction of the arrow 12, in an existing optical illuminating system, such as described for reflected light microscopes, for example, in No. DE-Gbm 79 17 232, wherein locking means known in themselves assure the accurate alignment of the module $M_o$ in the path B of the illuminating beam.

From a source of laser light, in the form of a laser diode LD in the example shown, a, preferably pulsed, light is emitted. Appropriately, an IR measuring light is used, because it does not interfere detrimentally with the microscopic image. The measuring beam M is guided by a stationary lens 13 and then a lens 14. Lens 14 may be displaced in the axial direction, according to the double arrow 15 indicated by a broken line, manually or by a motor to control the measuring beam, as will be discussed in greater detail hereinafter. After passing through lens 14, beam M is reflected by the dichromatic divider mirror $T_2$ arranged at the optical intersection of the two beam paths M and B. In the intermediate image plane, in which the radiant field diaphragm 9 is located, an image of the laser light source LD is produced.

To cause the measuring spot 16 to wander on the surface of the object 1 during defocusing, one-half of the pupil 17 is covered. The geometrical covering of one-half of the full measuring beam M is effected by a combined optical structural element, for example a deviating prism 18, which is introduced at the height of the pupil 17 to a depth of one-half of the measuring beam M. Deviating prism 18 contains a fully reflective prism surface 19. The portion of the full measuring beam not affected by the arrangement of the dividing prism 18 is indicated in FIG. 1 by a first shaded area. The eccentric portion of the measuring beam transmitted toward the object 1 is designated by the symbol $M_b$. The measuring light thus travels along $M_b$, i.e. eccentrically and essentially parallel to the optical axis of this modular partial system, and through the objective pupil 3.

Following reflection from the surface of the object 1, the reflected measuring beam $M_r$, indicated by a further shaded area, is reflected by $T_2$ and passes through the half of the pupil 17 which does not receive the originally transmitted measuring beam portion $M_b$. Reflected measuring beam $M_r$ is then reflected away from the path of measuring beam M by the fully reflecting surface 19 of the deviating prism 18. Following total reflection from the prism surface 20, beam $M_r$ is passed through an optical element 21 onto the differential photodetector, which consists of two photodiodes $D_1$ and $D_2$. In place of the deviating prism 18, as well as the other individual optical, mechanial and optoelectronic structural parts, different equivalent structural elements may be used.

In FIG. 4, the two photodiodes, the electronic connections of which with each other and the supply and control structural parts are now shown for the sake of simplicity, are presented in a detailed view. A small gap 22 is located between the two photodiodes and a diaphragm 23 is arranged in front of the photodiodes. Diaphragm 23 consists of two half diaphragms, with a diaphragm slit 24 kept free between them. As may be seen, the diaphragm slit 24 extends perpendicularly to the gap 22 and preferably has a width corresponding to the diameter of the image 16' of the measuring spot 16.

In FIG. 4 the image 16' of the measuring spot 16 is located exactly in a symmetrical position with respect to both photodiodes $D_1$ and $D_2$ so that both photodiodes are exposed to equal components of the luminar intensity. Thus, the entire system is in a focused state. In the case of defocusing, the image 16' of the spot 16 wanders out of its centered position in the direction of the double arrow 25. Means, not shown, guide the object 1, or, more accurately, the object stage 26 (FIG. 1) in the direction of the double arrow 27 as a function of the degree of displacement of image 16' until the focused state is re-established. Obviously, in place of the adjustment of the object stage in the z direction, a z displacement of the objective may also be effected.

The width of the diaphragm slit 24 may be variable. It is further possible to widen the diaphragm slit beginning with a narrow center area so that it constantly widens toward the two individual photodiodes $D_1$ and $D_2$. In this case, however, symmetrical surface conditions with respect to an imaginary symmetry plane perpendicular to the plane of the drawing in the gap 22, must exist.

In the intermediate image plane in which the radiant field diaphragm 9 is arranged, a marker 10a or 10b, respectively, is located, with the aid of which the position of the invisible measuring spot 16 is determined.

Marker 10a (FIG. 3) may consist of a sandwich like double glass plate 31a, containing two liquid cyrstal layers 28, 29 crossing each other in the center of the plate and capable of, depending on the voltage applied (not shown), rendering the center intersection 30 light impermeable. Marker 10a has the advantage that it may be activated and deactivated as needed.

As an alternative to marker 10, a marker 10b (FIG. 2) may be provided; it consists of a glass plate 31b, to which line markings 32 are applied in the manner of the face of a timepiece, with the nonexistent extension of the lines pointing toward the center of the plate. They thus represent an aid for the detection of the position of the measuring spot 16. The marker 10a or 10b is intentionally located in the path of the illuminating beam B, so that its imaging on the surface of the object 1 takes place without an additional light source.

As seen in FIG. 1, the position of the measuring spot 16 may be marked by a small auxiliary source of light 33 emitting visible light, which, as indicated by the two double arrows 34, is adjustable in its position and which is reproduced by an optical element 35, the divider mirror $T_1$ and the tubular lens 4 in the intermediate image plane 5. The images of the object 1 and the auxiliary source of light 33 are superposed on each other here and may be viewed by the observer with the occular $O_k$, not shown.

As mentioned hereinabove, the lens 14 may be displaced parallel to the optical axis of the measuring beam M, axially and longitudinally of the lens, in a defined manner, both manually and by use of a motor with position feedback. As the result of these lens translations, the following supplemental functions may be effected in the apparatus according to the present invention.

Firstly, a defined defocusing ("offset") may be set, so that, in the case of structured objects with details of different height in the z-direction, microscopic obervations may be effected at different levels of height. Secondly, using a measuring beam in the infrared range, the focal differences from objective to objective between the infrared and the visible light ranges may be corrected.

The displacement in the axial (longitudinal) direction of the lens 14 to obtain a defined defocusing has the advantage compared to transverse displacement of the differential photodetectors that the measuring point on the object does not move out of range in the controlled state of the automatic laser focus. A further advantage is the fact that the measuring spot 16 has a minimal diameter and, therefore, the position of the center of intensity is rendered independent of the structure of the object.

A code may be used in order to obtain an automatic focus equalization when using different objectives (an objective revolver), which, in spite of optimum correction in the visible range, are affected by individual chromatic imaging errors in the infrared range. The coding may be in a known form such as, for example, light barriers mounted on the objective revolver. The coding may be used for coordination or position detection of the objective in the active position. This detection may be effected in an electronic control center (not shown)

from which signals are emitted to move the lens 14 into a corrected position. When using a different objective, the active position thereof is again "reported" to the control center with the aid of the coding. The center (microprocessor) instructs the setting motor (not shown) for the lens 14 to displace the lens axially as a function of the degree of correction required by the selected objective. In this manner, optimum sharpness in the visible (observation) range is assured when objectives are changed.

Optical instruments in which "objects" in the broadest sense, for example, microscopic preparations, glass plates, semiconductor disks, printed circuit, slides, information storage means, photographic plates, etc., must be moved into a focused position may be equipped with the automatic focusing apparatus according to the present invention. The automatic focusing apparatus may be incorporated in the optical instrument or may be adapted as a module attached to the optical instrument. When using the present invention, at least a partial area of the object must be reflective and be positioned in the path of the measuring beam.

What is claimed is:

1. An apparatus for automatically focusing objects to be viewed in optical instruments having an illuminating beam path passing through an objective, onto an object to be positioned in the focal plane of said objective, said apparatus comprising:
    a laser light source for producing a full measuring beam having a defined path;
    an optical structural element positioned for geometrically blocking a portion of said full measuring beam path to produce an eccentric measuring beam;
    means for reflecting said eccentric measuring beam into said illumination beam path, and reflecting a reflected eccentric measuring beam out of said illumination beam path into the blocked portion of said full measuring beam path, whereby said eccentric measuring beam passes through said objective, is focused by said objective as a measuring point on said object and is reflected eccentrically along said illumination path, and said eccentric reflected measuring beam is reflected out of said illumination path into the blocked portion of said full measuring beam path;
    a differential photodetector;
    means for passing said reflected eccentric measuring beam from said blocked portion of said full measuring beam path onto said differential photodetector to form an image of said measuring spot on on said differential photodetector, comprising a reflective side of a surface on said optical structural element positioned to geometrically block the reflected eccentric measuring beam out of said blocked portion of said full measuring beam path; and
    an axially adjustable lens positioned in the path of said eccentric measuring beam and said eccentric reflected measuring beam for optically adjusting said eccentric measuring beam and said eccentric reflected measuring beam,
    wherein the position of said image of said measuring spot wanders on said photodetector in dependence on the focal position of said object relative to said objective focal plane.

2. An apparatus according to claim 1, wherein said apparatus comprises a module for insertion in said illuminating beam path of said optical instrument, and wherein said illumination beam path comprises a light source and a first partially permeable beam splitter arranged in an imaging beam path of said optical instrument, said module being positioned between said light source and said first partially permeable beam splitter, and further wherein said means for reflecting comprises a second beam splitter in the path of said illuminating beam.

3. An apparatus according to claim 2, wherein a sliding diaphragm carrying at least two aperture diaphragms with different dimensions is positioned between said second beam splitter and said light source.

4. An apparatus according to claim 1, wherein a radiant field diaphragm is positioned in said illumination beam path and a marker is arranged in the plane of said radiant field diaphragm.

5. An apparatus according to claim 4, wherein said marker comprises liquid crystal layers crossing each other, with an adjustable light attenuation characteristic in their crossing range.

6. An apparatus according to claim 4, wherein said marker comprises a glass plate and a plurality of line markings located in a peripheral area of said glass plate and pointing toward the center of said glass plate.

7. An apparatus according to claim 1, wherein said differential photodetector comprises a pair of photodetector elements separated by a gap and including a diaphragm having a slit positioned in front of said photodetector elements with said slit extends perpendicularly to said gap and said slit is aligned in the direction wandering of said image of said measuring spot.

8. An apparatus according to claim 7, wherein said slit has a width which corresponds to the size of said image of said measuring spot.

9. An apparatus according to claim 7, wherein said slit comprises an opening having a narrow center part and widens toward both photodetector elements in a manner symmetrical with respect to the axis of the slit.

10. An apparatus according to claim 1, including means for marking said measuring point comprising an adjustable auxiliary light source emitting visible light, said light source being imaged in an intermediate image plane of an imaging beam path of said optical instrument by an optical element a first partially permeable beam splitter and a tubular lens.

11. An apparatus according to claim 1, wherein said laser light source emits laser light in the infrared range.

12. An apparatus according to claim 1, wherein said laser light source emits pulsed laser light.

13. An apparatus according to claim 1, including means for adjusting said lens system as a function of a predetermined defocusing.

14. An apparatus according to claim 1, including means for automatically compensating for chromatic errors of said objective as a function of the wave length or wave length range of said measuring beam.

15. An apparatus according to claim 14, wherein said compensating means comprises structural elements, a control unit, and an adjusting motor for said lens system for effecting displacement into an optimal, wave length specific and objective specific compensating position.

16. An apparatus according to claim 1, wherein said portion of said measuring beam blocked by said optical structural element is one-half of said measuring beam.

17. An apparatus according to claim 1, wherein said means for passing said reflected eccentric measuring beam from said blocked portion of said full measuring beam path comprises a reflective surface on said optical structural element.

18. An apparatus according to claim 11, wherein said laser light has a wave length of 903 nm.

19. An apparatus according to claim 1, wherein a side opposite to said reflective side of said surface blocks a portion of said full measuring beam.

20. An apparatus according to claim 1, wherein said reflecting means comprises a single reflective surface.

* * * * *